United States Patent [19]

Tagawa

[11] Patent Number: 5,009,629
[45] Date of Patent: Apr. 23, 1991

[54] SHIFT LEVER ASSEMBLY FOR BICYCLE

[75] Inventor: Koichi Tagawa, Kawachinagano, Japan

[73] Assignee: Maeda Industries, Ltd., Osaka, Japan

[21] Appl. No.: 503,854

[22] Filed: Apr. 3, 1990

[30] Foreign Application Priority Data

Apr. 5, 1989 [JP] Japan .................................. 1-86148

[51] Int. Cl.$^5$ .................................................. B62M 25/00
[52] U.S. Cl. .................................. 474/80; 280/238; 74/469; 74/493; 74/537; 74/502.2
[58] Field of Search ............. D12/111, 114, 122, 123, D12/124, 179; 74/469, 493, 494, 551.2, 537, 502.2; 475/297; 280/238; 474/80

[56] References Cited

U.S. PATENT DOCUMENTS

| | | | |
|---|---|---|---|
| 4,580,997 | 4/1986 | Browning et al. | 474/80 |
| 4,690,662 | 9/1987 | Nagano | 74/502.2 |
| 4,768,395 | 9/1988 | Tagawa | 74/502.2 |
| 4,828,535 | 5/1989 | Sinoquet | 474/80 |
| 4,885,951 | 12/1989 | Descenclos et al. | 74/502.2 |
| 4,920,818 | 5/1990 | Nagano | 74/502.2 |

FOREIGN PATENT DOCUMENTS

| | | | |
|---|---|---|---|
| 3632845 | 4/1987 | Fed. Rep. of Germany | 74/502.2 |
| 3632846 | 4/1987 | Fed. Rep. of Germany | 74/502.2 |
| 48-23627 | 7/1973 | Japan | |

Primary Examiner—Ramon S. Britts
Assistant Examiner—Roger J. Schoeppel
Attorney, Agent, or Firm—William H. Eilberg

[57] ABSTRACT

A shift lever assembly for use in a bicycle wherein a wire connected at its one end to a derailleur is wound up or paid out to operate the derailleur. The assembly comprises a lever pivot fixed to the handlebar of the bicycle; a shift lever having a base-end boss portion rotatably supported by one end of the pivot and an arm portion extending from the boss portion; wire winder separate from the lever and rotatably supported by the pivot; a lever-coupled member provided between the boss portion and the winder and supported by the pivot so as to be rotatable with the winder; and a clutch for transmitting the rotation of the shift lever to the lever-coupled member. The shift lever is so biased by a spring as to return to a neutral position for starting rotation toward the wire winding direction and the wire paying-out direction. The clutch transmits to the lever-coupled member the rotation of the lever from the neutral position through a desired angle but does not transmit to the lever-coupled member the rotation of the lever to the neutral position.

10 Claims, 6 Drawing Sheets

SHIFT LEVER ASSEMBLY FOR BICYCLE

FIELD OF INDUSTRIAL APPLICATION

The present invention relates to a shift lever assembly for changing the speed of a bicycle, and more particularly to such an assembly which is so adapted that the rider can move the shift lever both forward and reverse directions through a desired angle while grasping the handle grips.

BACKGROUND OF THE INVENTION

With bicycles having a multi-sprocket device for a front or rear gear, the speed of the bicycle is changed by manipulating a shift lever assembly mounted on a suitable portion of the frame of the bicycle to operate a rear derailleur or front derailleur for engaging the chain with a selected sprocket of the multi-sprocket device.

The shift lever assembly comprises a pivot fixed to the bicycle frame, and a shift lever movably supported by the pivot. When pivotally moved, the shift lever pulls or pays out a wire connected to the derailleur. The longitudinal movement thus given to the wire is transmitted to the derailleur to operate the derailleur.

The shift lever is usually attached to the downtube of the bicycle frame, but this involves a hazard since the lever needs to be manipulated for a speed change by the hand removed from the handle grip. Accordingly, shift lever assemblies have been proposed which are adapted to be manipulated with the hand grasping the handle grip.

For example, Examined Japanese Patent Publication SHO 48-23627 discloses a shift lever assembly comprising a wire winding portion and a shift lever which are separate members but are rotatable on the same pivot. A gear disposed on the wire winding portion and a pawl disposed on the shift lever and biased toward the outer periphery of the gear provide a one-way clutch and also a stepwise rotational advancing mechanism, the shift lever being so biased as to return to a specified neutral position.

When the shift lever in the neutral position is rotated through a predetermined angle, the rotation is transmitted to the wire winding portion through the clutch mechanism. When released from the hand, the shift lever automatically returns to the neutral position, with the wire winding portion held in the rotated position owing to friction imparted to this portion. The shift lever, when rotated again through the predetermined angle, further rotates the wire winding portion through a specified angle in the same manner as above. In this way, the shift lever which returns to the neutral position at all times is repeatedly rotated by the predetermined amount, whereby the wire winding portion is rotatingly advanced stepwise by the desired amount to operate the derailleur. Furthermore, the shift lever assembly is so adapted that the wire winding portion can be rotated stepwise by repeatedly rotating the shift lever, biased to return to the neutral position, through the predetermined angle not only in the forward direction (e.g., wire winding direction) but also in the reverse direction (wire paying-out direction).

Nevertheless, the disclosed shift lever assembly still has the following problems.

First, the one-way clutch mechanism comprises a gear which needs to be smaller in diameter and therefore in the number of teeth if the mechanism is to be compacted, and a pawl which must be in engagement with the tooth of the gear whenever the shift lever is in its neutral position, so that the angle through which the shift lever is moved at a time needs to be restricted to an angle corresponding to the circumferential pitch between the teeth of the gear. The restricted angle of rotation of the shift lever then will not always correspond to the position to which the derailleur is to be guided, with the result that a satisfactory speed change will not be made. For the derailleur to shiftingly engage the chain with a selected sprocket of the multi-sprocket device, it is required that the chain guide of the derailleur be brought to a position exactly corresponding to the selected sprocket, whereas this can not always be achieved by the shift lever.

Second, the amount of advance afforded by the rotation of the shift lever through the predetermined angle at a time is accumulated stepwise to obtain the desired amount of rotation of the wire winding portion, so that even if it is attempted to shift the chain, for example, from a diametrically largest sprocket (low-speed sprocket) of the rear gear to a diametrically smallest sprocket (high-speed sprocket) quickly, the rider must follow the cumbersome procedure of repeatedly moving the shift lever, failing to effect a rapid speed change in accordance with the situation encountered.

SUMMARY OF THE INVENTION

Accordingly, the main object of the present invention is to provide a shift lever assembly for bicycles which can be manipulated for speed changes with the hand grasping the handle grip by either of two methods in both the forward and reverse directions; one method wherein wire winding means incorporated in the assembly is advanced stepwise by repeating a number of times the procedure of rotating the shift lever, which is returned to its neutral position, through a small angle at a time, and the other method wherein the wire winding means is rotated a specified amount by rotating the lever through a large angle in a single stroke.

Another object of the present invention is to provide a shift lever assembly for bicycles which can be manipulated for speed changes with the hand grasping the handle grip and in which wire winding means incorporated in the assembly can be rotated stepwise by repeating a number of times the procedure of rotating the shift lever, which automatically returns to its neutral position, through a desired angle at a time in either of forward and reverse directions.

To fulfill the above objects, the present invention provides the following device.

The present invention provides a shift lever assembly for use in a bicycle wherein a wire connected at its one end to a derailleur is wound up or paid out to operate the derailleur, the assembly including a lever pivot fixedly mounted on the handlebar of the bicycle; a shift lever having a base-end boss portion rotatably fitted around and supported by one end of the lever pivot and an arm portion extending from the boss portion; wire winding means separate from the shift lever and rotatably fitted around and supported by the lever pivot; a lever-coupled member provided between the boss portion of the shift lever and the wire winding means and supported by the lever pivot so as to be rotatable with the wire winding means; and a clutch mechanism for transmitting the rotation of the shift lever to the lever-coupled member; the shift lever being so biased by a spring as to return to a neutral position serving as a point of starting rotation in the wire winding direction and the wire paying-out direction; the clutch mechanism being operable to transmit to the lever-coupled member the rotation of the shift lever from the neutral position through a desired angle and not to transmit to the lever-coupled member the rotation of the shift lever to the neutral position.

According to an embodiment of the invention, the clutch mechanism has a roller portion formed on the lever-coupled member, a pair of holding spaces provided in the shift lever so as to form in cooperation with the outer periphery of the roller portion approximately wedge-shaped spaces oriented in opposite directions to each other, a pair of approximately wedge-shaped clutch members accommodated in the respective holding spaces and each biased by a spring toward the outer periphery of the roller portion, and means for canceling the clutch action of one of the pair of clutch members while the shift lever is in rotation from the neutral position.

According to the embodiment, the clutch action canceling means comprises a bulging portion formed on each of the clutch members, and a cam partly in the form of a circular-arc, fixedly provided on the lever pivot and engageable with the bulging portion to retract one of the clutch members into the holding space.

With the shift lever assembly of the present invention, when the shift lever is rotated from the neutral position in the wire winding direction or wire paying-out direction, the rotation is transmitted through the clutch mechanism to the lever-coupled member, causing the wire winding means to rotate with this member. The rotation of the wire winding means operates the derailleur through the wire connected thereto, shifting the chain into engagement with any desired sprocket.

The shift lever is spring-biased to return to the neutral position. Accordingly, when the shift lever having been rotated in the wire winding or paying-out direction is released from the finger, the shift lever automatically returns to the neutral position. At this time, the wire winding means does not rotate with the shift lever since the clutch mechanism does not transmit the rotation of the shift lever toward the neutral position to the lever-coupled member. This obviates the likelihood that the wire will be unintentionally wound up or paid out.

Consequently, the shift lever can be rotated always from the neutral, and the wire winding means can be advanced stepwise by rotating the shift lever, which has automatically returned to the neutral position, a number of times through a small angle each time. The shift lever can therefore be manipulated without releasing the hand from the handle grip and without changing the position of the hand grasping the grip.

Further, the shift lever can be pivoted through any optional angle in a single stroke within a certain limit. In other words, the rotational angle of the shift lever for each pivotal stroke may be varied depending on various situations.

Thus according to the present invention, the shift lever assembly can be manipulated with the hand grasping the handle grip by either of two methods; one method wherein the wire winding means is advanced stepwise by repeatedly moving the shift lever through a small angle at each time, and the other method wherein the shift lever and the wire winding means are rotated a larger angle in a stroke steplessly.

The clutch mechanism is adapted to transmit the rotation of the shift lever through an optional angle to the lever-coupled member. As a result, the angle of rotation of the wire winding means which is rotated with the lever-coupled member is adjustable as desired. Since the wire winding means is not so adapted that it is rotatable stepwise only through a predetermined angle at a time, the chain guide of the derailleur can be guided immediately to a proper position for the contemplated sprocket.

DESCRIPTION OF THE PREFERRED EMBODIMENT

An embodiment of the present invention will be described below with reference to the accompanying drawings.

Figure 1:
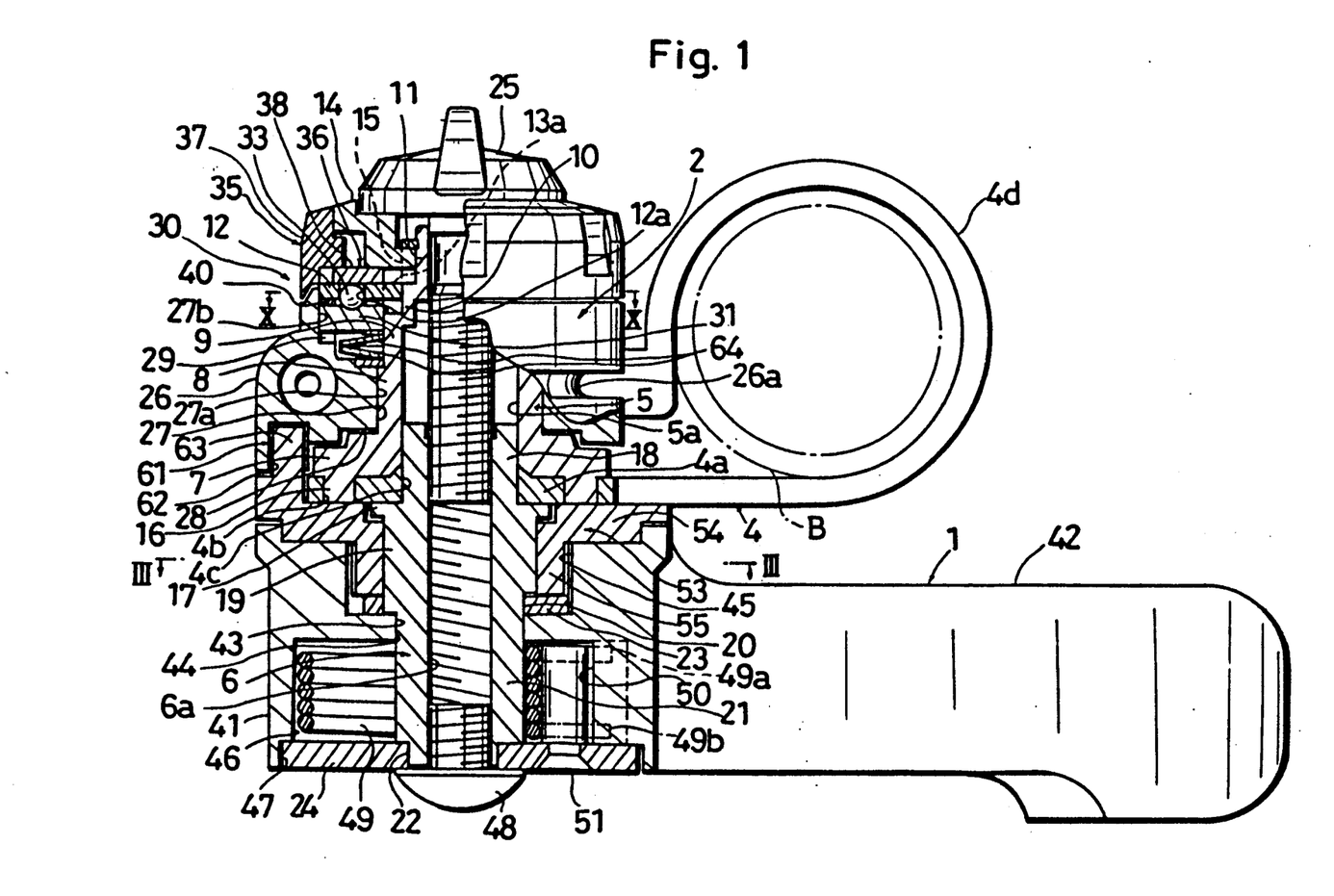
FIG. 1 is a view in vertical section of a shift lever assembly embodying the present invention.

FIG. 1 shows a shift lever assembly embodying the invention and comprising a shift lever 1 and wire winding means 2 rotatable by and opposed to the shift lever 1. The shift lever 1 and the wire winding means 2 are rotatable about the same axis and are disposed on opposite sides of a base plate 4a of a lever base 4 to be fastened to a handlebar B in the vicinity of a grip thereof. Thus, the type and function of the entire assembly are made changeable by replacing the winding means 2 only by like means of different type.

According to the embodiment, the wire winding means 2 is settable selectively in a so-called click mode wherein the means 2 is clicked into positions arranged at a predetermined angular spacing and corresponding to the respective speed change steps of a derailleur, or in a so-called friction mode wherein the means 2 is retained by friction at the position with an optional angle of rotation.

An upper lever pivot 5 and a lower lever pivot 6 are provided to hold the base plate 4a of the lever base 4 therebetween. The upper pivot 5 supports the wire winding means 2 thereon, and the lower pivot 6 supports the shift lever 1 thereon.

Figure 2:
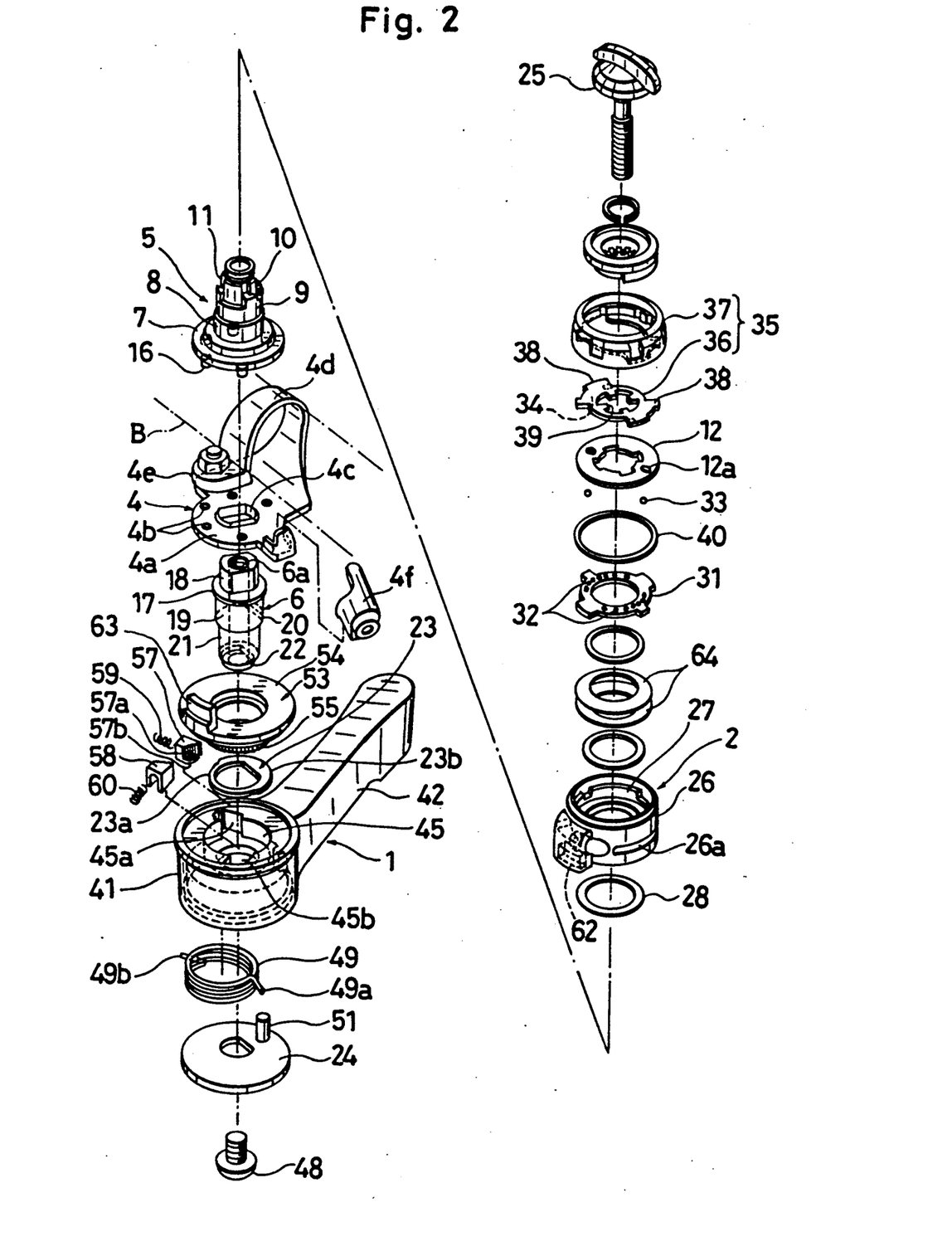
FIG. 2 is an exploded perspective view of the shift lever assembly.
Figure 10:
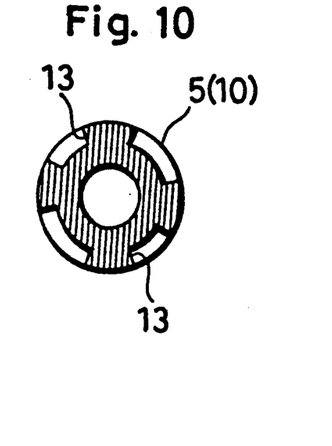
FIG. 10 is a view corresponding to a view in section taken along the line X—X in FIG. 1.

With reference to FIGS. 1 and 2, the upper lever pivot 5 is substantially in the form of a hollow cylinder and has a large-diameter base portion 7, shank portion 8, tubular portion 9, ball holder support portion 10 and reel holder support portion 11 which are arranged from its base end upward and reduced stepwise in diameter from portion to portion. As seen in FIG. 10, the ball holder support portion 10 is splined as at 13 for engagement with a ball holder 12 to prevent the holder 12 from rotating relative to the support portion 10. Similarly, the reel holder support portion 11 is splined as at 15 for engagement with a reel holder 14 to prevent the holder 14 from rotating relative to the support portion 11. The large-diameter base portion 7 has a plurality of pins 16 projecting from its bottom surface and arranged at a specified spacing circumferentially of the lever pivot 5. On the other hand, the base plate 4a is formed with a plurality of pinholes 4b positioned in coincidence with the pins 16 (see FIGS. 1, 2 and 6). The upper lever pivot 5 is held against rotation relative to the lever base 4 by the engagement of the pins 16 in the respective pinholes 4b.

Figure 6:
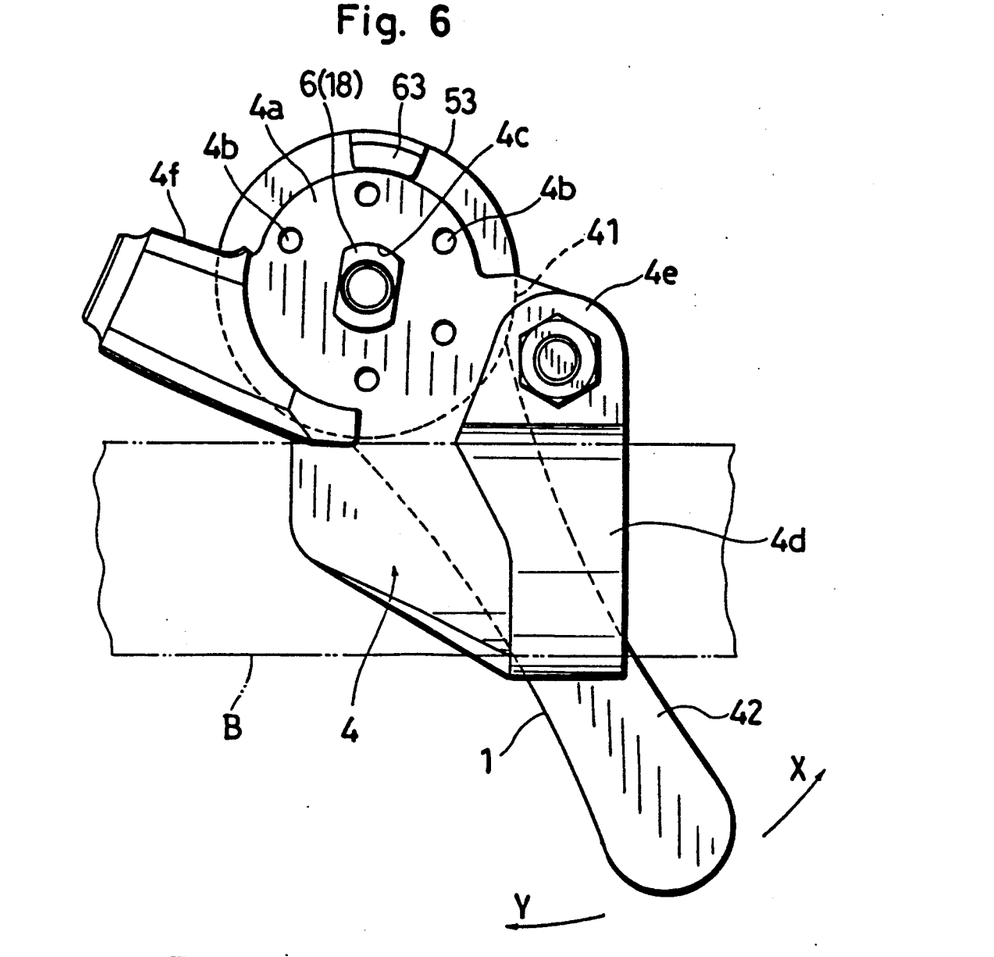
FIG. 6 is a plan view showing the embodiment with wire winding means removed.
Figure 7:
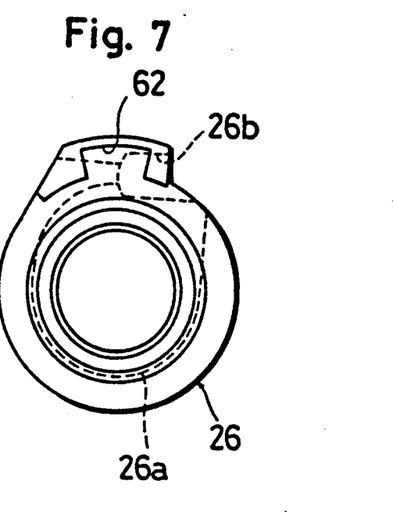
FIG. 7 is a bottom view of a reel included in the embodiment.

As shown in FIGS. 1 and 2, the lower lever pivot 6 has a plug portion 18 of noncircular cross section projecting upward from a base-end flange portion 17 which is in contact with the lower surface of the base plate 4a. Below the flange portion 17, the pivot 6 has a roller support portion 19, control plate support portion 20, lever support portion 21 and closure support portion 22 which are arranged downward in this order. The plug portion 18 is inserted through a plug hole 4c of the base plate 4a into a bore 5a extending through the upper lever pivot 5 axially thereof. To prevent the lower pivot 6 from rotating relative to the lever base 4, the plug hole 4c is shaped in conformity with the shape of the plug portion 18 as seen in FIGS. 2 and 6. The control plate support portion 20 and the closure support portion 22 are noncircular in cross section. A clutch control plate 23 and a closure 24 are fitted around these portions 20 and 22, respectively, nonrotatably relative thereto.

The lower lever pivot 6 is formed with an axial threaded bore 6a extending therethrough. A fastening bolt 25 is inserted through the axial bore 5a of the upper lever pivot 5 from its top end and screwed into the threaded bore 6a of the lower lever pivot 6, whereby the upper and lower lever pivots 5, 6 are fixed to the lever base 4. The lever base 4 is integral with a clamp band 4d, by which the base is fixed to the handlebar B.

With reference to FIGS. 1 and 2, the wire winding means 2 comprises a reel 26 in the form of a hollow cylinder and having a wire winding groove 26a in its outer periphery and a nipple retaining bore 26b in communication with the groove 26a, and a reel holding mechanism 30 for holding the reel 26 to the upper lever pivot 5 at a predetermined or optional rotated position.

The reel 26 is formed with a central bore 27 which has a base-end small diameter portion 27a, and an upper-end large diameter portion 27b positioned above and extending from the small diameter portion 27a. With the small diameter portion 27a fitted around the shank portion 8 of the upper pivot 5, the reel 26 is supported by and rotatable about the upper pivot 5. A spring washer 28 is interposed between the lower surface of the reel 26 and the upper surface of the large-diameter base portion 7 of the upper lever pivot 5.

An annular space 29 is formed inside the large diameter portion 27b around the upper lever pivot 5. The reel holding mechanism 30 is provided in the annular space 29 to the outside portion thereof. As already stated, the reel holding mechanism 30 is adapted to select the click mode in which the reel 26 can be clicked stepwise into positions arranged at a predetermined angular spacing, or the friction mode wherein the reel 26 is retainable by friction at the position of optional angle of rotation.

The holding mechanism, i.e., click mechanism 30, comprises a click plate 31 having a plurality of engaging cavities 32 arranged at a specified spacing circumferentially of the upper lever pivot 5, and the aforementioned ball holder 12 loosely holding steel balls 33 serving as engaging members.

Figure 8:
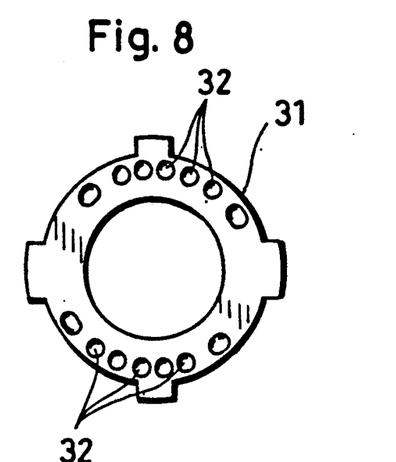
FIG. 8 is a plan view of a click plate as a component of a click mechanism included in the embodiment.

As shown in FIGS. 2 and 8, the click plate 31 is in the form of a disc resembling a doughnut, rotatably fitted around the tubular portion 9 of the upper pivot 5 while being biased by disc springs 64, 64 outwardly of the pivot 5 and splined as fitted in the large diameter portion 27b to the reel 26 so as to be rotatable therewith. With the present embodiment, the engaging cavities 32 are divided into two groups opposed to each other diametrically of the click plate.

As seen in FIG. 1, the steel balls 33 held by the ball holder 12 are arranged on the outer side of the click plate 31. As shown in FIG. 2, the ball holder 12, which is generally in the form of a doughnutlike disc, is fitted around and supported by the support portion 10 of the upper lever pivot 5 nonrotatably relative thereto. The ball holder 12 has ball retaining holes 12a at two portions as spaced apart circumferentially thereof in corresponding relation with the two groups of cavities 32. The steel balls 33, having a diameter larger than the thickness of the holder 12, are loosely fitted and retained in the respective holes 12a.

A rotatable selector 35 rotatable about the upper lever pivot 5 by the rider is provided outside the ball holder 12 and the steel balls 33 retained thereby and has ball bearing faces 34 for backing up the selected ones of the steel balls.

The rotatable selector 35 comprises a control plate 36 having the ball bearing faces 34, and a selector ring 37 having the control plate 36 fitted therein nonrotatably relative thereto.

As seen in FIG. 1, the selector ring 37 is rotatably fitted around the reel holder 14 nonrotatably fitted around the support portion 11 of the upper lever pivot 5 and is retainable at predetermined rotated positions with a click. The fastening bolt 25 inserted through the upper lever pivot and screwed into the threaded bore 6a of the lower lever pivot 6 has a flange head which is in bearing contact with the upper surface of the reel holder 14, whereby the reel holder 14 is adapted to exert pressure on the control plate 36 axially inwardly of the upper pivot 5 (downward in FIG. 1).

Figure 9:
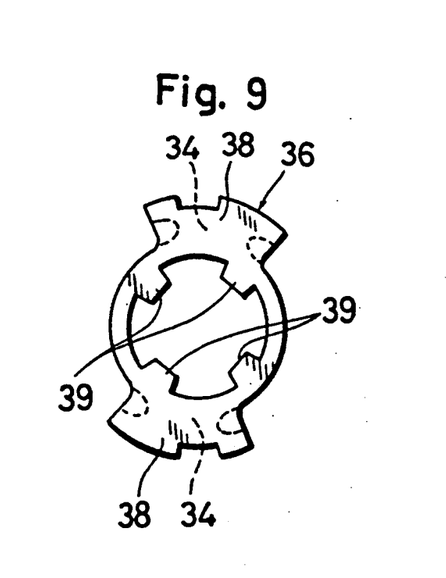
FIG. 9 is a plan view of a control plate as a component of the click mechanism.

With reference to FIGS. 2 and 9, the control plate 36 is generally annular and has ear pieces 38, 38 at diametrically opposed outer peripheral portions thereof. The lower faces of these ear pieces 38 serve as the ball bearing faces 34. The control plate 36 is further formed on its inner periphery with inward projections 39 shaped in conformity with the shape of the end faces 13a of the splines 13 of ball holder support portion 10 of the upper lever pivot 5. In other words, these projections 39 are fittable to the splines 13 slidably axially thereof when the control plate 36 is in a rotated position. When the control plate 36 is in a rotated position where the inward projections 39 rest on the end faces 13a of the respective splines 13 as seen in FIG. 1, the control plate 36 is unable to exert pressure on the ball holder 12 axially of the upper pivot 5. When the control plate 36 is rotated from the second-mentioned rotated position through a predetermined angle to the first-mentioned rotated position where the inward projections 39 are slidably fitted to the splines 13, the plate 36 is capable of exerting pressure on the ball holder 12 axially of the pivot.

When the control plate 36 is in the rotated position where the plate exerts no pressure on the ball holder 12, the ear pieces 38 are so positioned as to back up the steel balls 33 retained by the ball holder 12. In this state, the steel balls 33 are restrained from retracting outward axially of the lever pivot and resiliently held in contact with the click plate 31. When the reel 26 is rotated, accordingly, the steel ball 33 engages in the cavities 32 of the click plate 31 one after another with the result that the reel 26 is retained stepwise with a click at every predetermined rotated position relative to the upper lever pivot 5.

On the other hand, when the control plate 36 is in the rotated position where the plate exerts the axial pressure on the ball holder 12, the ear pieces 38 are positioned not to back up the steel balls 33. In this state, the steel ball 33 and the click plate 31 are released from the resilient pressing contact with each other to disengage the click mechanism 30. In this state, the pressure from the reel holder 14 is transmitted to the reel 26 through the ball holder 12 and a washer 40. Consequently, the reel 26 is held by friction at an optional rotated position relative to the upper lever pivot 5.

With the wire winding means 2 of the present embodiment, the rotary selector 35, when rotated by the rider, readily selects the click mode wherein the reel 26 is retainable stepwise in the predetermined rotated positions, or the friction mode wherein the reel 26 is retainable in a desired rotated position by friction as described above.

The reel 26 is rotated by a lever-coupled member 53 rotatable by the shift lever 1 to be described below.

With reference to FIGS. 1 to 3, 5 and 6, the shift lever 1 has a base-end boss portion 41 fitted around and supported by the lower lever pivot 6, and an arm portion 42 radially outwardly extending from the boss portion 41.

As seen in FIG. 1, the boss portion 41 has a central bore 43 which is partly defined by a bearing portion 44 rotatably fitted around the lever support portion 21 of the lower lever pivot 6 and includes a roller housing portion 45 and a spring housing portion 46 each of a large diameter which are positioned above and below the bearing portion 44, respectively. A closure fitting portion 47 is formed below the spring housing portion 46.

The closure 24, which is in the form of a disc, is fitted in the portion 47 and fitted around the closure support portion 22 of the lever pivot 6 nonrotatably relative thereto. The closure 24 is fastened to the lower lever pivot 6 by a fastening screw 48 screwed into the threaded bore 6a of the lower pivot 6, whereby the shift lever 1 is prevented from slipping off.

Figure 5:
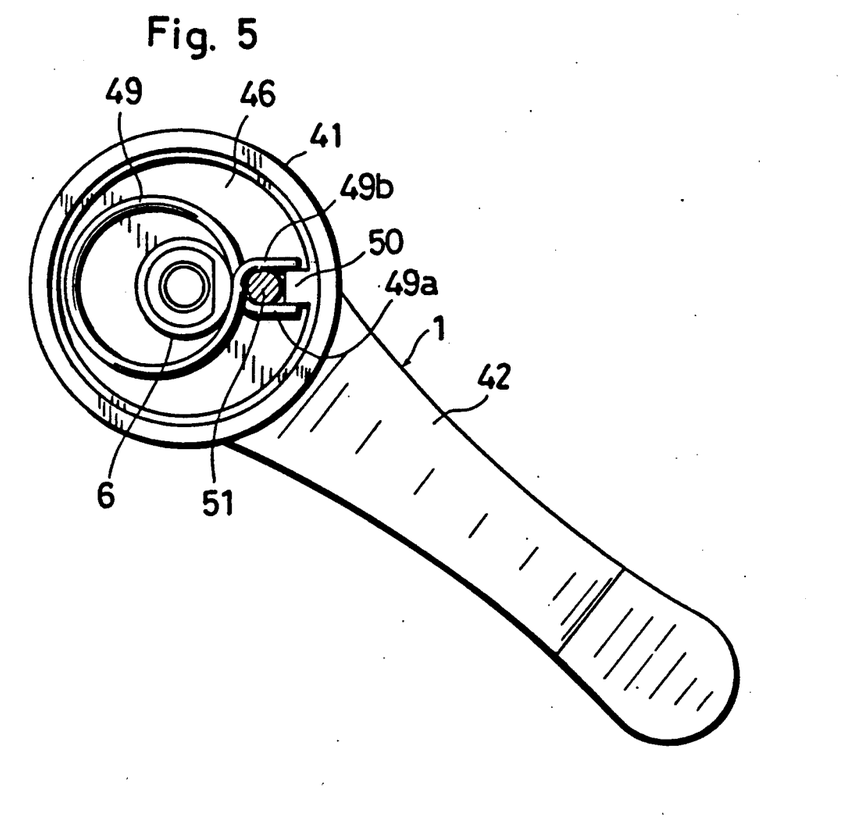
FIG. 5 is a rear view of a shift lever.

With reference to FIGS. 1 and 5, a coiled spring 49 is provided in the spring housing portion 46. The housing portion 46 is provided inside thereof with a spring engaging portion 50 holding the upper and lower free ends 49a, 49b of the spring 49 in clamping engagement therewith. The closure 24 has a spring retaining pin 51 inserted between the upper and lower spring free ends 49a, 49b in engagement therewith. The shift lever 1 is so biased by the spring 49 as to return, when not subjected to an external force, to a neutral position (i.e., the position shown in FIGS. 3(a) and 6) as a point for starting rotation in the wire winding direction and the wire paying-out direction. Thus, the shift lever 1, as rotated from the neutral position in the winding direction (the direction of arrow X in FIG. 6) or the paying-out direction (the direction of arrow Y in FIG. 6), automatically returns to the neutral position when released from the hand.

Figure 3A:
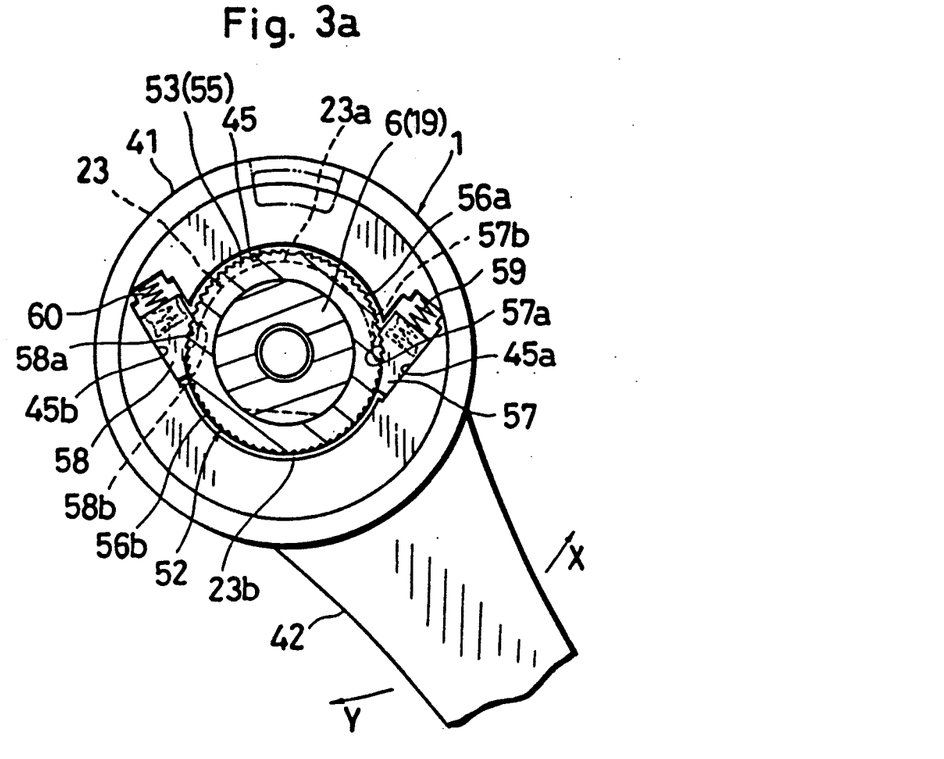
FIGS. 3(a) and (b) are views corresponding to a view in section taken along the line III—III in FIG. 1.
Figure 3B:
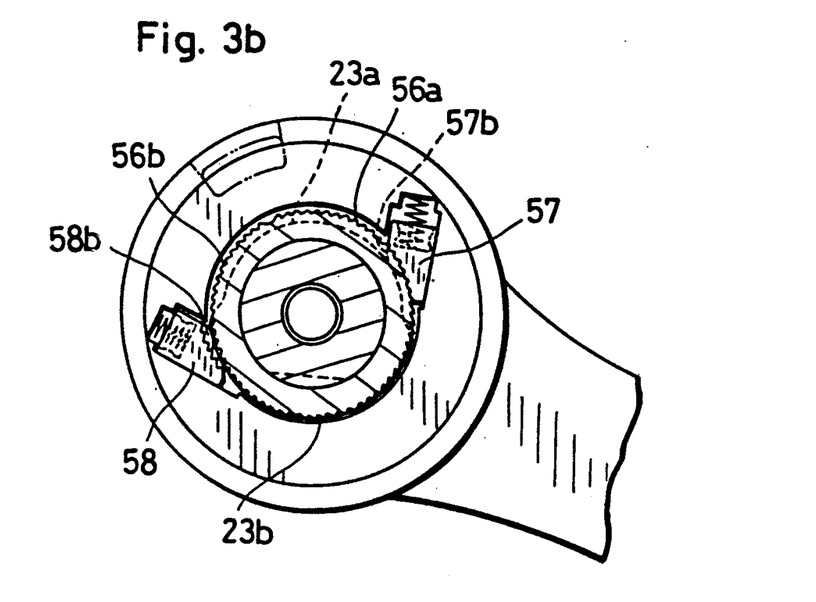

Further referring to FIGS. 1 and 3, the lever-coupled member 53 is accommodated in the roller housing portion 45 and coupled to the shift lever 1 through a coupling mechanism 52.

The lever-coupled member 53 has a disc portion 54 positioned between the boss portion 41 of the shift lever 1 and the base plate 4a of the lever base 4, and a roller portion 55 extending downward from the disc portion 54. The roller portion 55 is integral with the disc portion 54 and rotatably fitted around the roller support portion 19 of the lower lever pivot 6. The coupling mechanism 52 causes the lever-coupled member 53 to rotate with the shift lever 1 when the lever 1 is rotated from the neutral position either in the wire winding direction or in the wire paying-out direction but uncouples the member 53 from the shift lever 1 when the lever 1 returns to the neutral position. The coupling mechanism will be described below in detail.

With reference to FIGS. 1 and 3, the roller portion 55 of the embodiment is formed on its outer periphery with a pair of ratchet tooth rows 56a, 56b opposed to each other symmetrically and each comprising a multiplicity of small projections and extending over a range of about 180 degrees about the center of the roller portion. The pair of rows 56a and 56b are opposite to each other in tooth direction.

As seen in FIGS. 2 and 3, the inner periphery of the boss portion 41 defining the roller housing portion 45 is formed with cylindrical holding spaces 45a, 45b opposed to each other diametrically thereof. One of the holding spaces, 45a, has accommodated therein a clutch member 57 approximately wedge-shaped in its entirety and formed with a multiplicity of projections 57a on a circular-arc inner face thereof opposed to one of the rows of ratchet teeth, 56a. The clutch member 57 is slidable and biased by a spring 59 toward the outer periphery of the roller portion 55. Similarly, the other holding space 45b has accommodated therein a clutch member 58 generally wedge-shaped in its entirety and formed with a multiplicity of projections 58a on a circular-arc inner face thereof opposed to the other row of ratchet teeth 56b. The clutch member 58 is slidable and biased by a spring 60 toward the outer periphery of the roller portion 55. Each of the clutch members 57, 58 has a bulging portion 57b (58b) positioned at a lower level than the circular-arc inner face formed with the projections 57a (58a) and projecting toward the roller portion 55 beyond the inner face.

Figure 4:
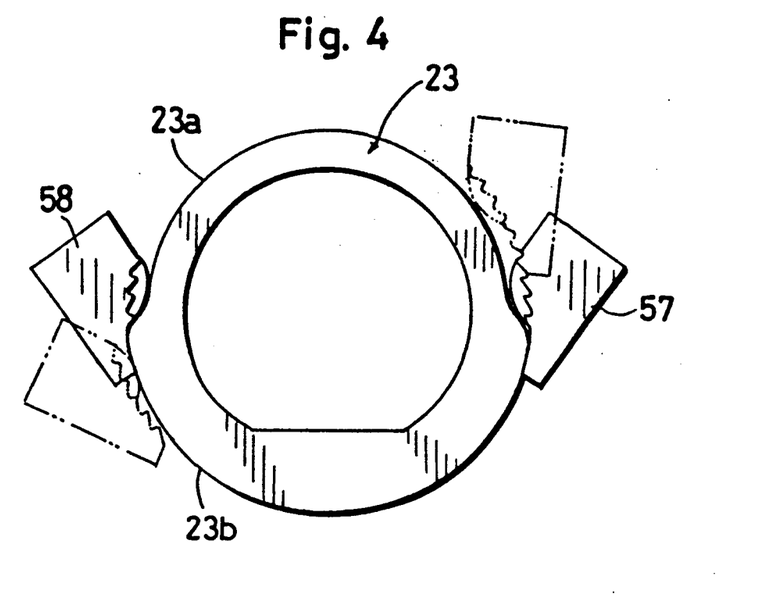
FIG. 4 is a plan view of a clutch control plate as a component of coupling mechanism of the embodiment.

Under the roller portion 55, the clutch control plate 23, which is generally annular, is fitted around the control plate support portion 20 of the lower lever pivot 6 nonrotatably relative thereto. With reference to FIGS. 2 to 4, the clutch control plate 23 comprises a semi-annular clutch operating control portion 23a having a radius smaller than the distance from the axis of the roller portion 55 to the bottom of the furrow between the teeth thereon, and a semi-annular clutch non-operating control portion 23b having a radius approximately equal to the distance from the axis of the roller portion to the top of the tooth thereon. Further as indicated in solid lines in FIGS. 3(a) and 4, the clutch control plate 23 is so disposed that when the shift lever 1 is in its neutral position, the bulging portions 57b, 58b of the opposite clutch members 57, 58 are positioned as opposed to the respective ends of the clutch operating control portion 23a. When the shift lever 1 is rotated, for example, in the direction of arrow X from this state, the bulging portion 58b of the left clutch member 58 comes into contact with the clutch non-operating control portion 23b as indicated in phantom lines in FIGS. 3(b) and 4, thereby bringing the left clutch member 58 out of contact with the roller portion 55, with the right clutch member 57 remaining in contact with the roller portion 55. At this time, the right clutch member 57, which is generally wedge-shaped, engages into the space between the outer periphery of the roller portion 55 and the inner wall defining the holding space 45a like a wedge by being assisted by the spring 59, whereby the member 53 is coupled by the clutch member 57 to the shift lever 1, which therefore rotates with the lever-coupled member 53 in the direction of arrow X. According to the present embodiment, the roller portion 55 and the clutch member 57 are formed with small projections which assure engagement therebetween without slippage, so that the clutch functions reliably.

On the other hand, when the shift lever 1 rotates to return to the neutral position, the clutch member 57 is released from the wedgelike engagement with the outer periphery of the roller portion 55 and the holding space defining inner wall. This obviates the likelihood that the roller portion 55, i.e., the lever-coupled member 53, will rotate with the return rotation of the shift lever 1.

In the case where the shift lever 1 is rotated from the neutral position in a direction opposite to the above, i.e., in the direction of arrow Y, the same clutch action as above causes the left clutch member 58 to couple the member 53 to the shift lever 1, with the result that the lever-coupled member 53 is rotated by the rotation of the lever 1 in the direction of arrow Y. At this time, the bulging portion 57b of the right clutch member 57 comes into contact with the clutch non-operating control portion 23b of the clutch control plate 23, holding this member out of clutch operation.

When the lever 1 returns to the neutral position after rotating in the direction of arrow Y, the clutch member 58 is released from the wedgelike engagement with the outer periphery of the roller portion 55 and the holding space defining inner wall. Accordingly, the roller portion 55, i.e., the lever-coupled member 53, will not rotate with the return rotation of the shift lever 1 to the neutral position.

As described above, only the rotation of the shift lever 1 from the neutral position is transmitted to the lever-coupled member 53 of the invention. The shift lever 1 may be pivoted from the neutral position through any desired angle within a maximum range. Thus, the lever-coupled member 53 can be rotatingly advanced in various angular steps by increasing or decreasing each angular stroke of the shift lever 1.

The movement of the lever-coupled member 53 is transmitted to the reel 26 by the engagement means 61 to be described below.

With reference to FIGS. 1, 2, 6 and 7, the engagement means 61 comprises an engaging piece 63 formed in the disc portion 54 of the lever-coupled member 53 and inserted in a cavity 62 formed in the bottom of the reel 26 at an outer portion thereof. Thus, the reel 26 is made rotatable with the lever-coupled member 53.

The maximum pivotal angle of the shift lever 1 is such that if the shift lever 1 is pivoted from the neutral position through the maximum angle, an immediate change between the highest and lowest speeds is achieved by a single pivotal stroke of the shift lever. According to the present embodiment, an end portion 4e of the clamp band 4d of the lever base 4, and an outer wire holder cover 4f attached to the lever base 4 as seen in FIG. 6 are utilized as stoppers for the reel 26. The contact of the reel 26 with these stoppers determines the end positions of rotation of the shift lever 1 in the wire winding and paying-out directions.

With the shift lever assembly embodying the invention and having the foregoing construction, the shift lever 1 is so biased by the spring 49 as to automatically return to the neutral position for starting its rotation in the wire winding and paying-out directions, so that the shift lever 1 can be repeatedly manipulated for rotation always from the same starting position. The lever-coupled member 53 and the reel 26 remain non-rotated when the lever 1 returns to the neutral position. This eliminates the likelihood that the wire is unexpectedly wound up or paid out when the shift lever 1 returns to the neutral position. Consequently, the reel 26 can be intermittently rotated a specified amount by rotating the shift lever 1 repeatedly a number of times from the same starting position each time. The shift lever 1 can therefore be manipulated by the hand which need not be removed from the handlebar. This assures speed changes with safety and ease.

According to the present embodiment, moreover, the shift lever 1 is attached to the lower lever pivot 6 projecting downward from the lever base 4. The shift lever 1, thus disposed below the handlebar B, can be manipulated with the thumb or index finger without any need to change the position of the hand grasping the grip. The lever is therefore very easy to manipulate.

Since the pivotal angle of the shift lever 1 for each stroke is optionally selectable it is possible, for example, to change from the highest speed to the lowest speed in an emergency by rotating the shift lever through a maximum angle in a single stroke.

According to the embodiment, the shift lever 1 and the wire winding means 2 are provided independently on opposite sides of the lever base 4, and the movement of the shift lever is transmitted to the winding means 2 through the engagement means. Accordingly, the function of the overall shift lever assembly can be easily altered by replacing the wire winding means 2 alone by a different winding means. More specifically, the wire winding means 2 of the above embodiment, which is designed to suitably select either one of the click mode and the friction mode, may be replaced, for example, by another means having a click mechanism only.

Further according to the present embodiment, the coupling mechanism 52 to be provided between the shift lever 1 and the lever-coupled member 53 is completely housed within the lever 1. This serves to make the assembly compact and assures a smooth operation over a longer period than when the coupling mechanism is exposed to the exterior.

The scope of the present invention is not limited to the foregoing embodiment. Although the wire winding means is mounted on the upper end of the upper lever pivot, with the shift lever mounted on the lower end of the lower lever pivot according to the embodiment, the winding means and the lever can be arranged reversely to the above. The engagement means between the lever-coupled member and the wire winding means can be modified variously. For example, a connector extending from the lever-coupled member integrally therewith may be fastened to the winding means with screws. The mechanism for coupling the shift lever to the lever-coupled member can also be modified variously.

What is claimed is:

1. A bicycle shift lever assembly for operating a derailleur by winding up or paying out a wire which connects the lever assembly to the derailleur, the lever assembly comprising:

pivot means fixedly mountable to a bicycle handlebar, the pivot means including a first pivot and a second pivot removably connected coaxially to the first pivot, a shift lever having a boss portion rotatably fitted around the first pivot, the shift lever further having an arm portion extending from the boss portion, the shift lever being spring-biased to return to a neutral position from which the shift lever is rotatable in two opposite directions, wire winding means provided separately from the shift lever and rotatably fitted around the second pivot, a lever-coupled member provided between the lever boss portion and the wire winding means for rotation with the wire winding means, and a clutch mechanism for causing the shift lever to rotate with the lever-coupled member away from the neutral position while allowing the shift lever to return to the neutral position without simultaneous rotation of the lever-coupled member.

2. A lever assembly as defined in claim 1, wherein the wire winding means includes a reel, and a rotational mode controller for the reel.

3. A lever assembly as defined in claim 2, wherein the mode controller comprises a click mechanism for retaining the reel at a pre-determined angular interval.

4. A lever assembly as defined in claim 3, wherein the click mechanism comprises a click plate mounted on the second pivot for rotation with the reel and having at least one series of engaging cavities, and at least one ball held by a holder which is non-rotatably mounted on the second pivot, the ball being selectively engageable with the series of engaging cavities.

5. A lever assembly as defined in claim 3, wherein the mode controller is further capable of selecting a frictional mode wherein the reel is frictionally held at any rotational position.

6. A lever assembly as defined in claim 2, wherein the mode controller is capable of providing a frictional mode wherein the reel is frictionally held at any rotational position.

7. A lever assembly as defined in claim 1, wherein the lever-coupled member is provided with a projection, whereas the wire winding means is provided with a recess for engagement with the projection of the lever-coupled member, whereby the lever-coupled member is rotatable with the wire winding means.

8. A lever assembly as defined in claim 1, wherein the clutch mechanism comprises a roller portion formed on the lever-coupled member, the roller portion being formed with engaging teeth, a pair of wedge-shaped clutch members which are linearly movable toward and away from the roller portion and always spring-biased toward the roller portion, each clutch member being toothed for engagement with the teeth of the roller portion, and cancelling means for cancelling the clutch action of one of the clutch members while the shift lever is rotated from the neutral position.

9. A lever assembly as defined in claim 8, the cancelling means comprising a bulging portion formed on each of the clutch members, and a generally circular cam which has a smaller radius portion and a larger radius portion, whereby said each clutch member is held out of clutch action when the bulging portion thereof is in camming contact with the larger radius portion of the cam.

10. A lever assembly as defined in claim 8, wherein the roller portion is formed with a first series of teeth and a second series of teeth which are opposite in tooth orientation to the first series of teeth.

* * * * *